United States Patent [19]
Gamble et al.

[11] Patent Number: 6,069,930
[45] Date of Patent: May 30, 2000

[54] MODIFIED PASSIVE CONTAINMENT COOLING SYSTEM FOR A NUCLEAR REACTOR

[75] Inventors: Robert E. Gamble, Mountain View; Per F. Peterson, Berkeley, both of Calif.

[73] Assignee: General Electric Company, Schenectady, N.Y.

[21] Appl. No.: 09/103,450

[22] Filed: Jun. 24, 1998

Related U.S. Application Data

[60] Provisional application No. 60/051,131, Jun. 27, 1997.

[51] Int. Cl.⁷ .................................................. G21C 9/00
[52] U.S. Cl. ........................ 376/282; 376/283; 376/298; 376/299
[58] Field of Search ................................. 376/282, 283, 376/298, 299

[56] References Cited

U.S. PATENT DOCUMENTS

| | | | |
|---|---|---|---|
| 5,282,230 | 1/1994 | Billig et al. | 376/283 |
| 5,303,274 | 4/1994 | Sawyer | 376/283 |
| 5,377,243 | 12/1994 | Hill | 376/283 |
| 5,896,431 | 4/1999 | Cheung | 376/283 |

FOREIGN PATENT DOCUMENTS

| | | | |
|---|---|---|---|
| 63-266393 | 11/1988 | Japan | 376/282 |
| 1-199192 | 8/1989 | Japan | 376/283 |
| 3-269297 | 11/1991 | Japan | 376/282 |
| 6-222182 | 8/1994 | Japan | 376/283 |

*Primary Examiner*—Charles T. Jordan
*Assistant Examiner*—Jack Keith
*Attorney, Agent, or Firm*—Armstrong Teasdale LLP

[57] ABSTRACT

Modified passive containment cooling systems for cooling a reactor core of a boiling water nuclear reactor are described. The passive containment cooling system (PCCS), in one form, includes a vent line coupled to the vacuum breaker. The vent line includes a first end, a second end, and a passage extending between the first and second ends for transporting noncondensibles between the first and second ends. The first end is coupled to PCCS condenser, and the second end is submerged in a suppression pool. A branch extends from an intermediate portion of the vent line and is coupled to the vacuum breaker. The branch includes a first end, a second end, and a passage extending between the first and second ends. The first end of the branch is coupled to the intermediate portion of the vent line so that the branch passage is in communication with the vent line passage. The second end of the branch is coupled to the vacuum breaker so that the branch slopes substantially downwardly from its second end to its first end.

13 Claims, 4 Drawing Sheets

MODIFIED PASSIVE CONTAINMENT COOLING SYSTEM FOR A NUCLEAR REACTOR

CROSS-REFERENCE TO RELATED APPLICATION

This application claims the benefit of U.S. Provisional Application No. 60/051,131, filed Jun. 27, 1997.

FIELD OF THE INVENTION

This invention relates generally to nuclear reactors and, more particularly, to passive containment cooling systems for such reactors.

BACKGROUND OF THE INVENTION

One known boiling water nuclear reactor includes a drywell, a wetwell, a Gravity Driven Cooling System (GDCS) and a passive containment cooling system (PCCS). The drywell is designed to contain pressure resulting from a Loss-Of-Coolant Accident (LOCA), and the PCCS is configured to remove core decay heat following a LOCA and to limit the pressure within the reactor containment to a pressure below a design pressure of the containment during a LOCA.

The GDCS is substantially isolated from the drywell and is an emergency source of low pressure reactor coolant used following a loss of coolant event in at least one known boiling water reactor (BWR). A typical GDCS includes pools of coolant positioned so that when coolant from the pools must be supplied to the RPV, the coolant flows, under gravity forces, through the GDCS coolant delivery system into the RPV. Under normal reactor operating conditions, however, coolant from the GDCS does not flow into the RPV.

A typical PCCS includes several condensers positioned in a PCCS pool, or pools, of water. Each condenser includes an upper drum, a lower drum, and several heat exchanger tubes extending between the upper and lower drums. The upper drums are coupled to the drywell via a steam inlet passage, and steam generated within the containment and noncondensible gases flow from the upper drums and to the lower drums through the exchanger tubes. The steam is condensed into water and the condensed steam is drained from the lower drums and to a condensate drain tank via a condensate drain line.

The noncondensibles are purged from the lower drums utilizing vent lines. Particularly, a vent line extends from each lower drum and into the wetwell so that the noncondensibles collect in the wetwell. To condense any steam that might flow through the vent line and not through the condensate drain line, e.g., during a blowdown, one end of each vent line is submerged in the suppression pool.

The wetwell is separated from the containment drywell by a wall having an opening therein. A vacuum breaker typically seals the opening and is movable between an open position and a closed position. The vacuum breaker is a check valve which allows fluid to pass from the wetwell to the drywell to substantially prevent a large differential pressure from developing between the wetwell and the drywell. Particularly, if pressure in the wetwell becomes sufficiently great compared to pressure in the drywell, the vacuum breaker opens and allows fluid to pass from the wetwell to the drywell and reduce the differential pressure.

If the vacuum breaker becomes stuck in the open position, it is possible for the differential pressure between the wetwell and the drywell to reduce too much. Particularly, it is possible for the differential pressure to be insufficient to force noncondensibles to flow from the PCCS to the wetwell. The noncondensibles, accordingly, could build up in the PCCS and render the PCCS inoperable.

It is known that one way to prevent a vacuum breaker from sticking in the open position, is to utilize an isolation valve. However, isolation valves sometimes fail, which causes the vacuum breaker to cease operating. In addition, the isolation valve must often be monitored to ascertain whether it is working properly.

It would be desirable to provide a system facilitating the removal of noncondensibles from the PCCS even while the vacuum breaker is in the open position. It further would be desirable for such system to facilitate the maintenance of an acceptable drywell to wetwell pressure differential.

SUMMARY OF THE INVENTION

These and other objects may be attained by a passive containment cooling system (PCCS) which, in one form, includes a vent line coupled to the vacuum breaker. The vent line includes a first end, a second end, and a passage extending between the first and second ends for transporting noncondensibles and uncondensed steam between the first and second ends. The first end is coupled to a PCCS condenser, and the second end is submerged in a suppression pool.

A branch extends from an intermediate portion of the vent line and is coupled to the vacuum breaker. The branch includes a first end, a second end, and a passage extending between the first and second ends. The first end of the branch is coupled to the intermediate portion of the vent line so that the branch passage is in communication with the vent line passage. The second end of the branch is coupled to the vacuum breaker so that the branch slopes substantially downwardly from its second end to its first end.

The above described system facilitates removing noncondensibles from the PCCS even if the vacuum breaker is in the open position. Such system also facilitates maintaining an acceptable drywell to wetwell pressure differential.

DETAILED DESCRIPTION

Figure 1:
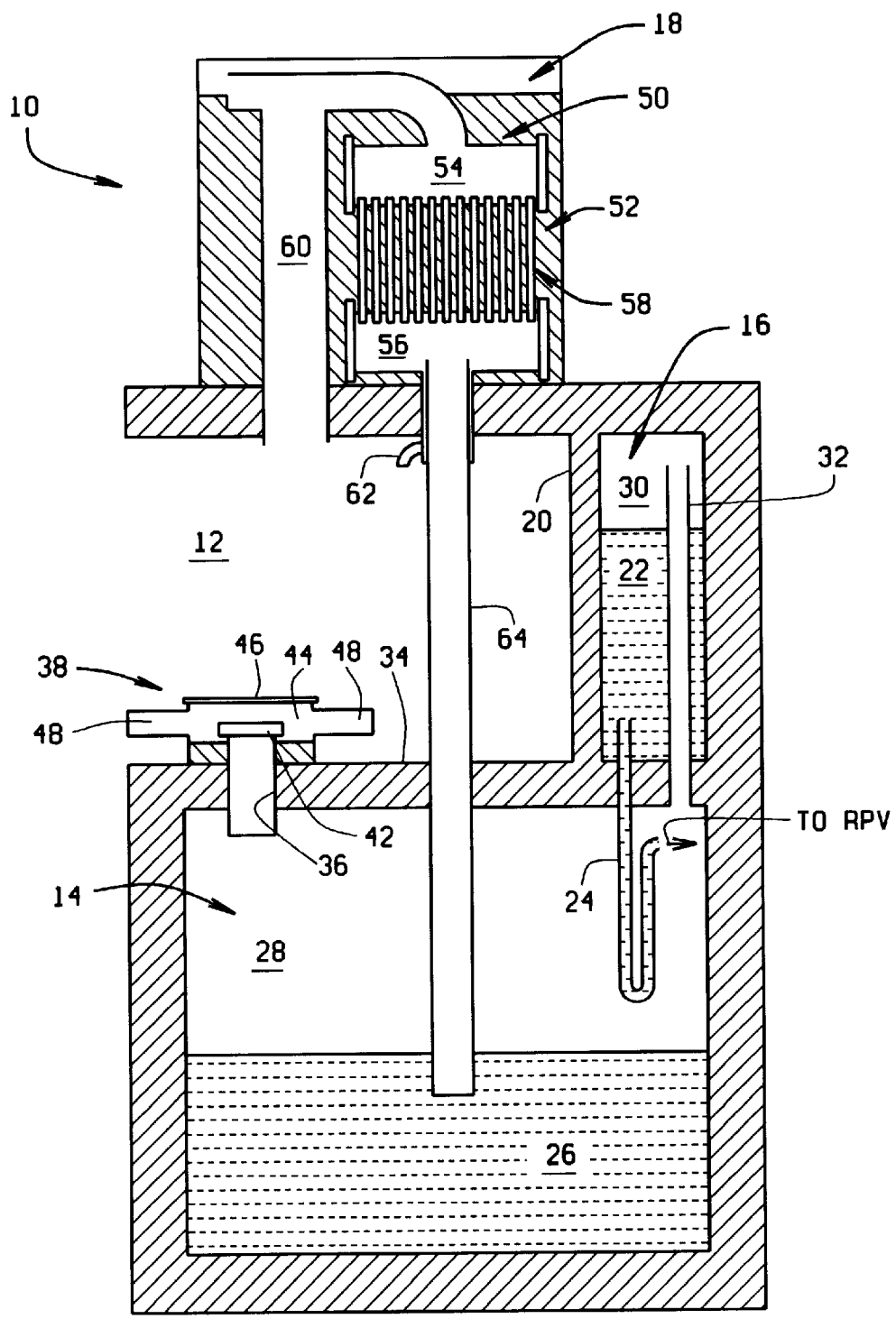
FIG. 1 is a schematic illustration of a known section of a boiling water reactor.
Figure 2:
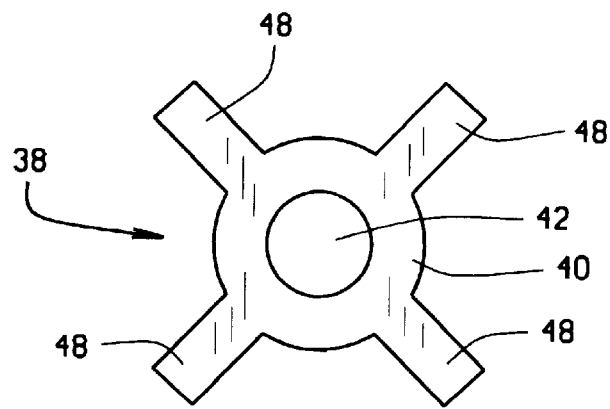
FIG. 2 is a top view schematic illustration of the vacuum breaker assembly shown in FIG. 1.

Referring to FIGS. 1 and 2, a known boiling water reactor 10 includes a drywell 12, a wetwell 14, a Gravity Driven Cooling System (GDCS) 16 and a passive containment cooling system (PCCS) 18. A reactor pressure vessel (RPV) having a core (not shown in FIG. 1) is positioned in drywell 12 and is coupled to GDCS 16. GDCS 16 is substantially separated from drywell 12 by a GDCS wall 20, and includes a pool of coolant 22 positioned so that when coolant from pool 22 must be supplied to the RPV, the coolant flows, under gravity forces, through a GDCS coolant delivery line 24 into the RPV. Under normal reactor operating conditions, however, coolant from GDCS 16 does not flow into the RPV.

Wetwell 14 includes a suppression pool of water 26 and is substantially separated from both drywell 12 and GDCS pool 22. An air space 28 above suppression pool 26 is connected to an air space 30 above GDCS pool 22 via a pipe 32 or other connecting element. A wall 34 extends between wetwell 14 and drywell 12, and an opening 36 extends therethrough to provide communication between air space 28 above suppression pool 26 and drywell 12.

A vacuum breaker assembly 38 is coupled to wall 34 to seal opening 36. Particularly, vacuum breaker assembly 38 includes a valve body 40 and a vacuum breaker 42. Valve body 40 includes an interior chamber 44, and an access cover 46 is coupled to valve body 40 to cover interior chamber 44. Four outlet passages, or filter screens, 48 extend from chamber 44, and facilitate transporting fluid between chamber 44 and a location outside of valve body 40.

Vacuum breaker 42 is positioned within chamber 44 and coupled to valve body 40. Vacuum breaker 42 is configured to move between a first position, or closed position, where vacuum breaker 42 substantially prevents fluid from passing through opening 36, and a second position, or open position, where vacuum breaker 42 enables fluid to pass from wetwell 14 to drywell 12 through opening 36 and outlet passages 48.

PCCS 18 includes a set of passive containment cooling condensers 50 (only one condenser 50 is shown in FIG. 1) positioned in a pool of water, or IC/PCC pool, 52, which is located outside containment drywell 12. Each condenser 50 includes an upper drum 54, a lower drum 56 and a plurality of tubes 58 extending between upper drum 54 and lower drum 56. Tubes 58 are configured to condense steam received from upper drum 54 and to transport the condensed steam to lower drum 56. A steam inlet path 60 extends between drywell 12 and upper drums 54 (only one upper drum 54 is shown in FIG. 1) and is configured to transport steam from within drywell 12 to upper drums 54. A condensate drain line 62 extends from each lower drum 56 (only one lower drum 56 is shown in FIG. 1) and into drywell 12, and a noncondensibles vent line 64 extends from each lower drum 56 and into suppression pool 26.

In operation, PCCS 18 and vacuum breaker assembly 38 cooperate to limit pressure within drywell 12 to a pressure below the design pressure of drywell 12 and to keep the pressure differential between drywell 12 and wetwell 14 sufficiently great to force noncondensibles to flow from PCCS 18 to wetwell 14 when needed. Particularly, vacuum breaker 42 operates as a check valve and if pressure in wetwell 14 becomes sufficiently great compared to pressure in drywell 12, vacuum breaker 42 opens and allows fluid to pass from wetwell 14 to drywell 12 and reduce the differential pressure. Alternatively, if the pressure differential between wetwell 14 and drywell 12 is insufficient to force noncondensibles to flow from PCCS 18 to wetwell 14, then vacuum breaker 42 closes to substantially prevent fluid from passing from wetwell 14 to drywell 12.

As explained above, known vacuum breakers sometimes become stuck in the open position, which may result in the pressure differential between wetwell 14 and drywell 12 to reduce too much. In such case, it is possible for noncondensibles to build up in lower drums 56 and tubes 58 and render PCCS 18 inoperable.

Figure 3:
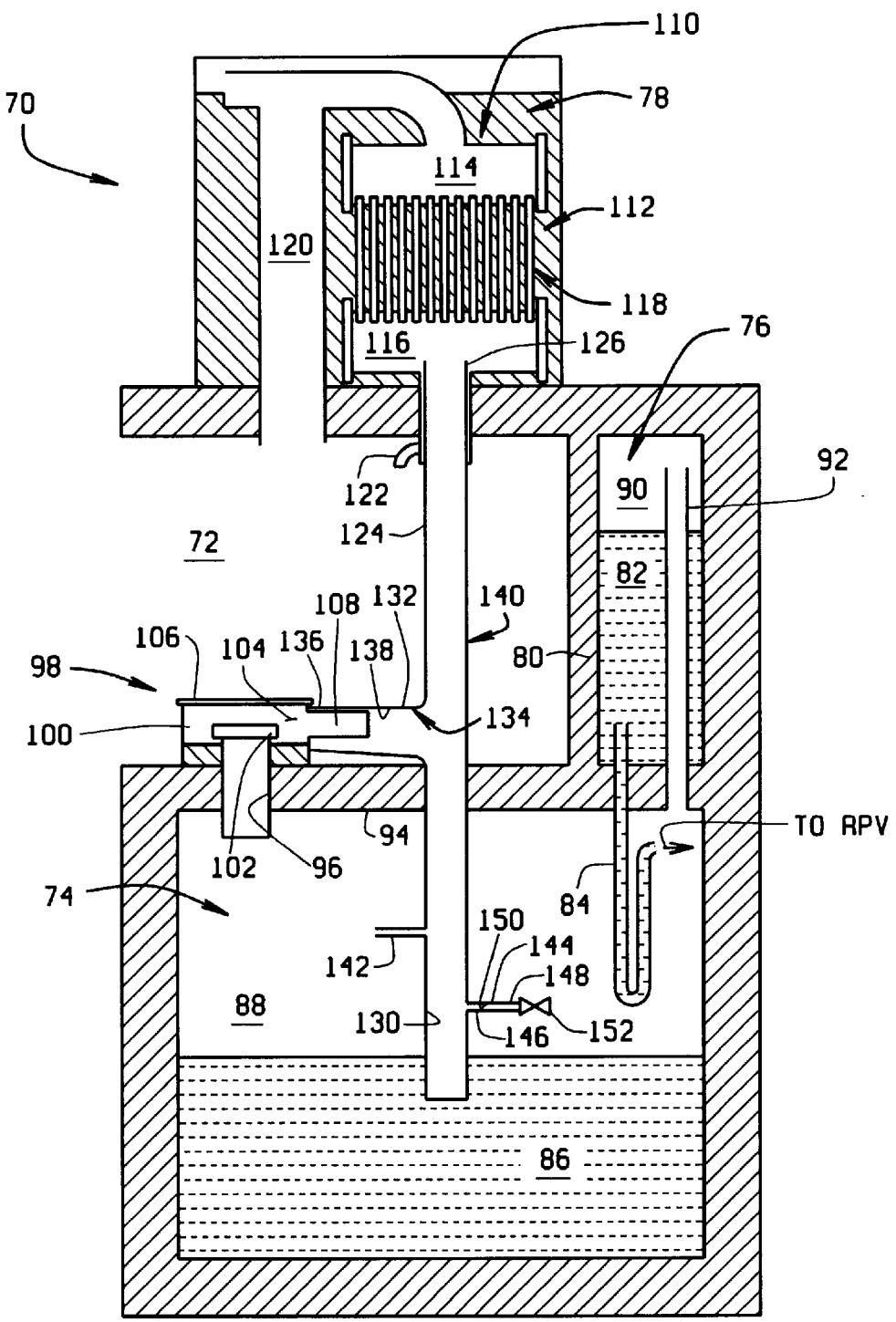
FIG. 3 is a schematic illustration of a section of a boiling water reactor in accordance with one embodiment of the invention.

FIG. 3 is a schematic illustration of a section of a boiling water reactor 70 in accordance with one embodiment of the present invention. Boiling water reactor 70 includes a drywell 72, a wetwell 74, a Gravity Driven Cooling System (GDCS) 76 and a passive containment cooling system (PCCS) 78. A reactor pressure vessel (RPV) having a core (not shown in FIG. 1) is positioned in drywell 72 and is coupled to GDCS 76. GDCS 76 is substantially separated from drywell 72 by a GDCS wall 80, and includes a pool of coolant 82 positioned so that when coolant from pool 82 must be supplied to the RPV, the coolant flows, under gravity forces, through a GDCS coolant delivery line 84 into the RPV. Under normal reactor operating conditions, however, coolant from GDCS 76 does not flow into the RPV.

Wetwell 74 includes a suppression pool of water 86 and is substantially separated from both drywell 72 and GDCS pool 82. An air space 88 above suppression pool 86 is connected to an air space 90 above GDCS pool 82 via a pipe 92 or other connecting element. A wall 94 extends between wetwell 74 and drywell 72, and an opening 96 extends therethrough to provide communication between air space 88 above suppression pool 86 and drywell 72.

A vacuum breaker assembly 98 is coupled to wall 94 to seal opening 96. Vacuum breaker assembly 98 includes a valve body 100 and a vacuum breaker 102. Valve body 100 includes an interior chamber 104, and an access cover 106 is coupled to valve body 100 to cover interior chamber 104. Four outlet passages, or filter screens, 108 extend from chamber 104, and facilitate transporting fluid between chamber 104 and a location outside of valve body 100.

Vacuum breaker 102 is positioned within chamber 104 and coupled to valve body 100. Vacuum breaker 102 is configured to move between a first position, or closed position, where vacuum breaker 102 substantially prevents fluid from passing through opening 96, and a second position, or open position, where vacuum breaker 102 enables fluid to pass from wetwell 74 to drywell 72 through opening 96 and outlet passages 108. Vacuum breaker assemblies are known.

PCCS 78 includes a set of, e.g., two, passive containment cooling condensers 110 (only one condenser 110 is shown in FIG. 1) positioned in a pool of water, or IC/PCC pool, 112, which is located outside containment drywell 72. Each condenser 110 includes an upper drum 114, a lower drum 116 and a plurality of tubes 118 extending between upper drum 114 and lower drum 116. Tubes 118 are configured to condense steam received from upper drum 114 and to transport the condensed steam to lower drum 116. A steam inlet path 120 extends between drywell 72 and upper drums 114 (only one upper drum 114 is shown in FIG. 3) and is configured to transport steam and noncondensible gas from within drywell 72 to upper drums 114. A condensate drain line 122 extends from each lower drum 116 (only one lower drum 116 is shown in FIG. 3) and into drywell 72.

A PCCS vent line 124 extends from each lower drum 116 and into suppression pool 86. Particularly, each vent line 124 is substantially hollow and includes a first end 126, a second end 128, and a passage 130 extending between ends 126 and 128. First end 126 is coupled to one of lower drums 116 and second end 128 is submerged in suppression pool 86.

To facilitate removing noncondensibles from PCCS 78 even while vacuum breaker 102 is in the open position, a vent line branch 132 is coupled between each vent line 124 and vacuum breaker assembly 98. Each vent line branch 132 is substantially hollow and includes a first end 134, a second end 136, and a passage 138 extending between ends 134 and 136. Branch first ends 134 are coupled to an intermediate portion 140 of vent line 124 so that each branch passage 138 is in communication with vent line passage 130. Branch second ends 136 are coupled to a respective vacuum breaker outlet passages 108.

Figure 4:
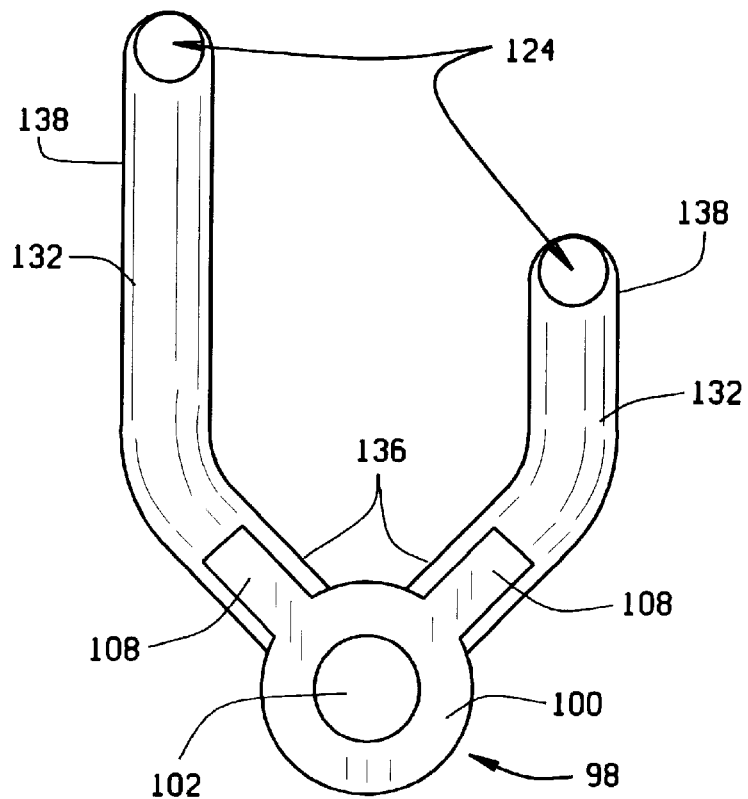
FIG. 4 is a top view schematic illustration of the vacuum breaker shown in FIG. 3 coupled to two vent lines.

Referring now to FIG. 4, vacuum breaker assembly 98 is coupled to two vent lines 124. One branch 132 extends between one vent line 124 and one vacuum filter screen 108.

To substantially maintain the primary function of vacuum breaker 102, e.g., to substantially ensure vacuum breaker 102 operates as a check valve which allows fluid to pass from wetwell 74 to drywell 72 to substantially prevent a large differential pressure from developing between wetwell 74 and drywell 72, each branch 132 is configured to substantially prevent condensate from accumulating around vacuum breaker 102. Particularly, each branch 132 is coupled between breaker valve assembly 44 and vent line 124 so that each branch 132 slopes substantially downwardly between its second end 136 and first end 134. Accordingly, each branch passage 138 slopes generally downwardly between branch second end 136 and branch first end 134, and facilitates draining condensate from each branch 132 and into suppression pool 86 via vent line passage 130.

In addition, each vent line 124 is coupled to another vent line 124. Particularly, a cross-tie 142 (FIG. 3) extends between each vent line 124 and another vent line 124. Cross-ties 142 (only one cross-tie 142 is shown in FIG. 3) may either be positioned in wetwell 74 (as shown in FIG. 3) or drywell 72.

In one embodiment of the present invention, to further reduce leakage between drywell 72 and wetwell 74, e.g., to limit the pressure differential between and leakage from drywell 72 to wetwell 74 even when vacuum breaker 102 is operating properly, and referring again to FIG. 3, PCCS 78 further includes a vent bypass line 144 extending between vent line 124 and wetwell 74. Vent bypass line 144 includes a first end 146, a second end 148, and a passage 150 extending between its respective first and second ends 146 and 148. First end 146 is coupled to vent line 124 adjacent vent line second end 128 so that vent bypass line passage 150 is in communication with vent line passage 130. Second end 148 of vent bypass line 144 is positioned in wetwell 74, and includes a valve 152 configured to move between a first, or closed, position and a second, or open position. Valve 152 may, for example, be an explosively opened valve, and is configured to be activated, e.g., opened, during a GDCS pool 82 drain down. Accordingly, vent bypass line 144 provides a substantially low flow resistance path that forces a majority of leak flow to pass through PCCS condensers 110 and enables noncondensibles to clear from PCCS condensers 110 even with a small drywell 72 to wetwell 74 pressure differential.

The above described system facilitates removing noncondensibles from the PCCS even if the vacuum breaker is in the open position. Such system also facilitates maintaining an acceptable drywell to wetwell pressure differential.

Figure 5:
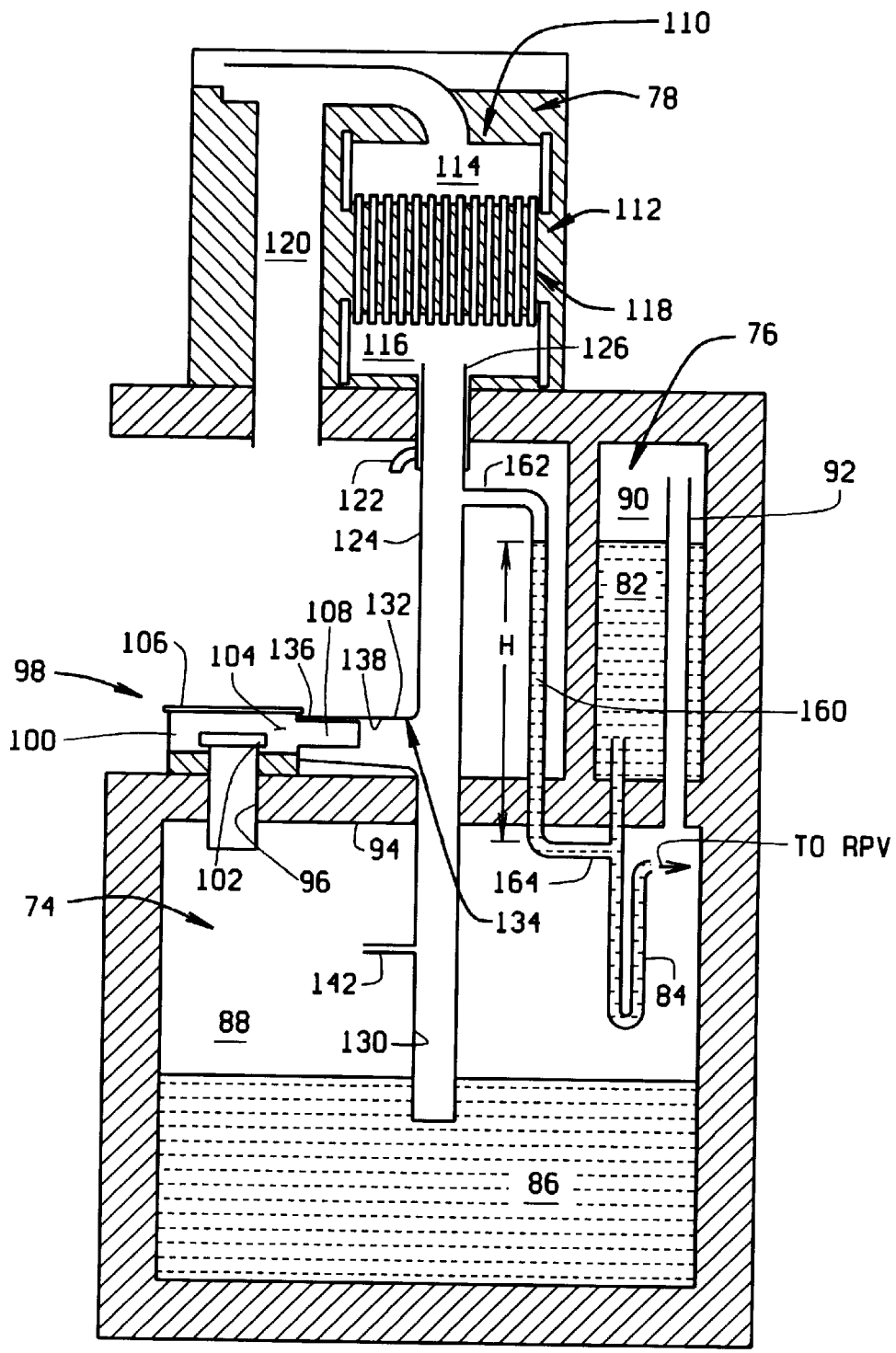
FIG. 5 is a schematic illustration of the section of boiling water reactor shown in FIG. 3 including a vent bypass line in accordance with another embodiment of the present invention.

In accordance with another embodiment of the present invention, and referring to FIG. 5, a vent bypass line 160 is extended between vent line 124 and wetwell 74 by coupling vent bypass line 160 between vent line 124 and GDCS pool of coolant 82. Particularly, vent bypass line 160 includes a first end 162, a second end 164, and a passage extending between first and second respective ends 162 and 164. First end 162 is coupled to vent line 124 adjacent vent line first end 126 in drywell 72. Second end 164 is coupled to GDCS delivery line 84 in wetwell 74. Second end 164 is spaced from first end 162 so that GDCS pool 82 substantially seals bypass line 160 during blow down. A height H between second end 164 and first end 162 is selected so that such seal will not be broken during a peak pressure differential during blow down, and so that when such seal is broken, GDCS pool 82 operates as a suppression pool for condensate flowing through bypass line 160. After drain down, however, an open connection exists between vent line 124, GDCS air space 90 and wetwell air space 88 and, accordingly, vent bypass line 160 provides a substantially low flow resistance path that forces a majority of leak flow to pass through PCCS condensers 110.

From the preceding description of various embodiments of the present invention, it is evident that the objects of the invention are attained. Although the invention has been described and illustrated in detail, it is to be clearly understood that the same is intended by way of illustration and example only and is not to be taken by way of limitation. For example, the above described system was described in connection with one set of two PCCS condensers and two vent lines. However, such system may include more than two condensers, and also may include more than two vent lines. Accordingly, the spirit and scope of the invention are to be limited only by the terms of the appended claims.

We claim:

1. A passive containment cooling system for a nuclear reactor, the nuclear reactor including a wetwell, a drywell, and a vacuum breaker positioned between the wetwell and the drywell, said system comprising:

at least one condenser;

at least one vent line having a first end, a second end, and a passage extending between said first and second ends, said vent line first end coupled to said at least one condenser, said vent line second end extending into the wetwell; and at least one branch having a first end, a second end, and a passage extending between said branch first and said branch second ends, said branch first end coupled to said vent line so that said branch passage is in communication with said vent line passage, said branch second end coupled to the vacuum breaker.

2. A passive containment cooling system in accordance with claim 1 wherein said vent line further comprises an intermediate portion between said first vent line end and said second vent line end, and wherein said branch first end is coupled to said vent line intermediate portion.

3. A passive containment cooling system in accordance with claim 1 wherein said branch second end is coupled to the vacuum breaker so that said branch slopes substantially downwardly from said branch second end to said branch first end.

4. A passive containment cooling system in accordance with claim 1 comprising at least two vent lines, one of said at least two vent lines coupled to at least one other of said at least two vent lines.

5. A passive containment cooling system in accordance with claim 1 wherein the wetwell includes a suppression pool, said vent line second end is submerged in the suppression pool, and wherein said system further comprises a vent bypass line extending between said vent line and the wetwell.

6. A passive containment cooling system in accordance with claim 5 wherein said vent bypass line comprises a first end and a second end, said vent bypass line first end coupled to said vent line adjacent said vent line second end, said vent bypass second end comprising a valve.

7. A passive containment cooling system in accordance with claim 5 wherein the nuclear reactor further includes a Gravity Driven Cooling System including a pool of coolant, wherein a connecting element extends between an air space above the pool of coolant and an air space above the suppression pool, and wherein said vent bypass line extends between said vent line and the pool of coolant.

8. A method for removing noncondensibles from a passive containment cooling system of a nuclear reactor utilizing a vent line branch, the nuclear reactor including a wetwell, a drywell, and a vacuum breaker positioned between the wetwell and the drywell, the passive containment cooling system including a condenser and a vent line, the vent line having a first end coupled to the condenser and having a second end positioned in the wetwell, said method comprising the steps of:

coupling a first end of the vent line branch to the vent line; and coupling a second end of the vent line branch to the vacuum breaker.

9. A method in accordance with claim 8 comprising the step of coupling the first end of the vent line so that the vent line branch slopes substantially downwardly from the second end of the vent line branch to the first end of the vent line branch.

10. A method in accordance with claim 8 comprising the step of coupling the first end of the vent line branch to the vent line adjacent the second end of the vent line.

11. A method in accordance with claim 8 wherein the passive containment cooling system includes at least two vent lines, and wherein said method further comprises the step of coupling at least one of the vent lines to at least one other of the vent lines.

12. A method in accordance with claim 8 wherein the wetwell includes a suppression pool and the vent line second end is submerged in the suppression pool, and wherein said method further comprises the step of extending a vent bypass line between the vent line and the wetwell.

13. A method in accordance with claim 8 wherein the nuclear reactor further includes a Gravity Driven Cooling System including a pool of coolant, wherein a connecting element extends between an air space above the pool of coolant and an air space above the suppression pool, and wherein said method further comprises the step of extending the vent bypass line between said vent line and the pool of coolant.

\* \* \* \* \*